United States Patent [19]

Saita et al.

[11] Patent Number: 5,055,309

[45] Date of Patent: Oct. 8, 1991

[54] PRODUCTION PROCESS FOR KEFIR-LIKE FERMENTED MILK

[75] Inventors: Taketsugu Saita; Yoshiharu Kuma; Norio Bukawa; Tomoko Saga, all of Tokyo, Japan

[73] Assignee: Yakult Honsha Co., Ltd., Tokyo, Japan

[21] Appl. No.: 366,520

[22] Filed: Jun. 15, 1989

[30] Foreign Application Priority Data

Jun. 16, 1988 [JP] Japan .................................. 63-146807

[51] Int. Cl.$^5$ ........................ A23C 9/127; A23C 9/137
[52] U.S. Cl. ........................................ 426/34; 436/41; 436/42; 436/43; 436/583
[58] Field of Search ....................... 426/34, 37, 40, 41, 426/42, 43, 583

[56] References Cited

U.S. PATENT DOCUMENTS

| | | |
|---|---|---|
| 3,563,760 | 2/1971 | Kuwabara et al. .................... 426/43 |
| 4,430,349 | 2/1984 | Malone et al. ......................... 426/34 |
| 4,579,739 | 4/1986 | Darbyshire ............................ 426/13 |
| 4,797,290 | 1/1989 | Tokumara et al. ................... 426/583 |
| 4,902,517 | 2/1990 | Nakagawa et al. ................... 426/42 |

FOREIGN PATENT DOCUMENTS 2123295 8/1972 France .

OTHER PUBLICATIONS

Patent Abstracts of Japan, vol. 13, No. 236 (C-602) [3584], 30th May 1989; & JP-A-1 47 338.

Primary Examiner—Marianne Cintins
Assistant Examiner—Helen Pratt
Attorney, Agent, or Firm—Oblon, Spivak, McClelland, Maier & Neustadt

[57] ABSTRACT

A kefir-like fermented milk is produced from a raw material, which contains lactose and at least one sugar, by subjecting the lactose to lactic acid fermentation with a lactic acid bacterium and the sugar to alcoholic fermentation with a yeast. The alcoholic fermentation is controlled, for example, by conducting same with a lactose non-fermenting and galactose non-fermenting yeast until all assimilable sugar sources are substantially eliminated. A gelatinous kefir-like fermented milk is also produced by controlling the alcoholic fermentation to start after addition of a gelling agent.

22 Claims, No Drawings

PRODUCTION PROCESS FOR KEFIR-LIKE FERMENTED MILK

FIELD OF THE INVENTION

1) Field of the Invention

This invention relates to a process for producing kefir or a similar fermented milk, which contains lactic acid and ethanol, while controlling the formation of ethanol.

2) Description of the Related Art

Kefir, a sort of fermented milk, is produced by simultaneously conducting lactic acid fermentation with a lactic acid bacterium and alcoholic fermentation with a yeast. Unlike ordinary fermented milks produced by using a lactic acid bacterium alone, kefir contains both ethanol and carbon dioxide gas and has characteristic flavor and taste. It is a traditional popular fermented milk habitually taken in the Eastern Europe and Russia. In recent years, it is also sold in Japan although the consumption is still at a low level.

Kefir is generally produced by using mixed cell aggregates called "kefir grains". Kefir grains contain plural lactic acid bacteria and plural yeasts. Using as a binder viscous polysaccharides produced externally by the lactic acid bacteria, the individual cells are bound together to have a granular form. Exemplary lactic acid bacteria in kefir grains include streptcocci such as *Streptococcus lactis, Streptococcus cremoris* and leuconostocs as well as lactobacilli. Many yeasts have been recognized, including *Candida pseudotropicalis, Candida kefir, Saccharomyces lactis, Saccharomyces fragiris, Saccharomyces unisporus, Saccharomyces bulgaricus, Saccharomyces cerevisiae* and *Saccharomyces carlsbergensis.*

When kefir is produced using kefir grains, the lactic acid bacteria and yeasts contained in the kefir grains remain in the product as they are. The lactic acid fermentation practically stops as the pH drops, but the alcoholic fermentation may still proceed by some yeasts capable of assimilating as sugar sources lactose and other sugars still remaining after packing of the product in containers provided that temperature conditions are met. Upon marketing of kefirs produced by the conventional processes, they are accompanied by the drawback that the secondary alcoholic fermentation tends to occur at the distribution stage of the products, thereby resulting not only in substantial changes in flavor and taste due to the formation of ethanol and carbon dioxide gas but also in bulging of containers and leakage of the contents due to the internal pressure increased by carbon dioxide gas.

On the other hand, it has been desired to develop kefir-like fermented milk which may allow kids to conveniently enjoy the characteristic flavor and taste of kefir. For this purpose it has been necessary to control the formation of ethanol as much as possible throughout the fermentation and production steps.

In gel-like, i.e., gelatinous lactic acid fermentation products such as so-called soft yogurt and hard yogurt, carbon dioxide which gives refreshing feeling is driven out by the gelling heat treatment if the alcoholic fermentation is conducted before the gelling reaction. It has hence been desired to develop a technique for allowing the alcoholic fermentation to start after the gelation.

SUMMARY OF THE INVENTION

With the foregoing in view, the present inventors have conducted an extensive investigation with a view toward developing a process for the production of kefir or a kefir-like fermented milk, which allows complete control of alcoholic fermentation. As a result, the stage and degree of the alcoholic fermentation have been found controllable as desired by exerting ingenuity in connection with the selection of a yeast for the alcoholic fermentation and the addition of an assimilable sugar source, leading to completion of this invention.

In one aspect of this invention, there is thus provided a process for the production of a kefir-like fermented milk from a raw material containing lactose and at least one sugar, including steps of subjecting the lactose to lactic acid fermentation with a lactic acid bacterium and subjecting the sugar to alcoholic fermentation with a yeast, which comprises controlling the alcoholic fermentation.

The conventional production processes of kefir require kefir grains which contain various lactic acid bacteria and yeasts. Therefore, it has heretofore been impossible to prevent secondary alcoholic fermentation of remaining lactose, galactose and the like as sugar sources at the distribution stage of the products. It has also been difficult to control the alcoholic fermentation even in the course of the production, leading to the drawback that the flavor and taste can hardly be stabilized. The process of the present invention allows the alcoholic fermentation to proceed under control in the course of the production, thereby completely solving the problem of subsequent alcoholic fermentation. The production process of this invention has therefore made it possible to easily produce a kefir-like fermented milk having stable quality and excellent storability.

Further, the present invention can also produce kefir-like fermented milk products having a low alcohol content. The present invention can therefore provide new foods for children.

The selectability of the starting stage of the alcoholic fermentation has made it possible to provide a new type of gelatinous kefir-like fermented milk products.

The above and other objects, features and advantages of the present invention will become apparent from the following description and the appended claims.

DETAILED DESCRIPTION OF THE INVENTION AND PREFERRED EMBODIMENTS

The term "kefir-like fermented milk or milk products" as used herein means not only kefir itself but also various similar fermented milk products. Namely, exemplary kefir-like fermented milk products are led by the above-described kefir-like fermented milk products containing no ethanol or having an extremely low ethanol content and include all fermented milk products somewhat different from kefir in milk solid contents, flavor, taste, flowability, etc. so long as they are produced by lactic acid fermentation and alcoholic fermentation.

Accordingly, kefir-like fermented milk products include not only liquid products but also gelatinous lactic acid fermentation products containing carbon dioxide such as soft yogurt and hard yogurt.

In lactic acid fermentation, as is known well, a lactic acid bacterium induces fermentation of lactose contained in mammal's milk as a starting material to produce lactic acid. Here, many lactic acid bacteria do not consume much of galactose which is one of the constituent sugars of lactose, so that galactose is accumulated either partly or wholly in the culture broth. On the other hand, the yeasts contained in kefir grains are classified into lactose fermenting ones and lactose non-fermenting ones. Both of these two types of yeasts however have galactose fermenting ability. Sugars which are fermented by the yeasts employed in conventional kefir production are lactose and galactose formed by lactic acid fermentation. It has thus been difficult to control the alcoholic fermentation.

In contrast, the process of the present invention can control the alcoholic fermentation (1) by using in combination a lactic acid bacterium, which does not cause accumulation of galactose in the culture broth, and a lactose non-fermenting yeast or (2) by selectively using a lactose non-fermenting and galactose non-fermenting yeast which is capable of fermenting neither lactose nor galactose.

There have been known a variety of lactic acid bacteria which do not cause accumulation of galactose in the culture broth as in the above process (1). A lactic acid bacterium suitable for the application purpose can be suitably chosen from these lactic acid bacteria. Illustrative usable lactic acid bacteria include *Streptococcus lactis, Streptococcus facalis, Lactobacillus casei, Lactobacillus lactis, Lactobacillus fermenti* and *Lactobacillus yougurti*. In contrast, exemplary lactic acid bacterial which cannot be used due to accumulation of galactose include *Lactobacillus brevis, Lactobacillus buchneri, Lactobacillus acidophilus,* and *Streptococcus thermophilus.*

Further, the use of a lactose non-fermenting yeast as the yeast in the process (1) is to avoid the consumption of lactose, which is contained in a large amount in milk and remains in a substantial (and moreover, varied) amount even after the lactic acid fermentation, as a sugar source for the alcoholic fermentation so that the alcohol fermentation can be controlled. There have also been known a variety of lactose non-fermenting yeasts which are usable for the above purpose, including *Saccharomyces cerevisiae, Saccharomyces unisporus* and *Saccharomyces carlbergensis.* In contrast, *Candida pseudotropicalis, Candida kefia, Saccharomyces lactis, Saccharomyces fragiris* and the like are unusable yeasts because they ferment lactose.

In the process (1), the lactic acid fermentation does not require any special conditions other than the use of such a galactose non-accumulating bacterium as described above.

The alcoholic fermentation is caused to take place by using such a lactose non-fermenting bacterium as described above. The fermentable sugar for the alcoholic fermentation is not dependent on any components of the raw material but is added separately. Because of the use of a galactose non-accumulating species as the lactic acid bacterium and a lactose non-fermenting species as the yeast, the yeast cannot undergo multiplication, to say nothing of alcoholic fermentation, unless a fermentable sugar is added separately. The sugar should generally be added in an amount necessary to form, by the alcoholic fermentation, ethanol in an amount desired to be contained in the final product. It is not desirable to use the sugar in any amount greater than that level. The amount of the sugar to be added can be calculated. It can also be determined easily by an experiment.

On the other hand, lactose non-fermenting and galactose non-fermenting yeasts usable in the process (2) have also been known and are available. Typical examples of these yeasts are as follows: (1) Sucrose non-fermenting yeasts:

*Saccharomyces bisporus* IFO-0467, *Saccharomyces mellis, Saccharomyces rouxii, Kuloeckera africana, Kuloeckera apiculata, Torulopsis anatomiae,* and *Torulopsis castellii.* (1) Sucrose fermenting yeasts:

*Saccharomyces bayanus, Saccharomyces fermentati, Candida solani* IFO-0762, *Kuloeckera javanica, Kuloeckera jensenii, Torulopsis bacillaris,* and *Torulopsis colliculosa,* IFO-0381.

The lactic acid fermentation of the process (2) can be conducted using a lactic acid bacterium employed usually for the production of a fermented milk or any other desired lactic acid bacterium. The fermentation does not require any special conditions.

The alcoholic fermentation is effected using a lactose non-fermenting and galactose non-fermenting yeast such as that referred to above. As the sugar to be consumed as a raw material in the alcoholic fermentation, it is preferable to add a sugar separately without depending wholly on one or more sugar components of mammal's milk. The sugar is generally added in an amount necessary to form, by the alcoholic fermentation, ethanol and carbon dioxide in amounts desired to be contained in the final product. It is not desirable to use the sugar in any amounts greater than that level. The amount of the sugar to be added can be calculated. It can also be determined easily by an experiment.

In the process of this invention, mammal's milk is usually employed as one of main raw materials. It is possible to use either an economically-available fresh milk such as cow's milk, goat's milk, horse's milk or buffalo's milk or a milk reconstituted from skim milk or powder milk.

Where the target product of the process of this invention is in a liquid form having relatively high flowability, the lactic acid fermentation and alcoholic fermentation may be conducted at the same time, or the lactic acid fermentation may be effected first, followed by the alcoholic fermentation.

For simultaneous fermentation, a milk containing a desired amount of a sugar for alcoholic fermentation added thereto is inoculated with starters of both lactic acid bacterium and yeast and is then incubated at a suitable temperature for fermentation.

For sequential fermentation, upon substantial completion of the lactic acid fermentation by a method known per se in the art, the culture broth is inoculated with a yeast starter to conduct the alcoholic fermentation. In this case, the sugar to be consumed in the alcoholic fermentation may desirably be added upon inoculation with the yeast starter. It is also possible to add the sugar to the mammal's milk before starting the lactic acid fermentation. (Even if the sugar is fermentable by the lactic acid bacterium, the lactic acid bacterium primarily consumes lactose in the milk and the amount of the sugar required for the alcoholic fermentation is not substantially different from a sugar unfermentable by the lactic acid bacterium.) As an alternative, upon inoculation of the milk with the lactic acid bacterium starter, the milk may also be inoculated with the yeast starter without addition of a sugar source for alcoholic fermentation. After completion of the lactic acid fermentation, the sugar source for alcoholic fermentation is added to initiate the growth of the yeast.

As the sugar to be added for the alcoholic fermentation, it is possible to use, for example, glucose, fructose or sucrose or a mixture therefore, e.g., isomerized sugar, fruit juice or the like.

Whichever fermentation method is employed, the alcoholic fermentation is allowed to proceed until the thus-added sugar for the alcoholic fermentation is substantially eliminated, preferably, until the content of the sugar thus added becomes 0.01% or less in the culture broth. The production process is thus completed.

On the other hand, when a gelled fermentation milk product having low flowability is desired, it is necessary to firstly conduct lactic acid fermentation and then to carry out gelation and alcoholic fermentation.

In the above instance, it is preferable to add in two separate portions the sugar source for the yeast and alcoholic fermentation. Namely, it is desirable to add a portion of the sugar source to the fermentation mixture for the culture of the yeast until immediately before the initiation of the alcoholic fermentation and the remaining portion of the sugar source at the stage when the gelling agent is added and the resulting mixture is packed in containers. This is for the following reasons.

To allow a yeast to conduct alcoholic fermentation, it is generally necessary that its cell population reaches $10^{6-7}$ cells/ml. Where the cell population is smaller than the above level, the power of causing alcoholic fermentation is extremely weak so that evolution of carbon dioxide gas is scarcely observed. When the addition of the sugar is first limited to a minimum level required for allowing the yeast to grow to $10^{6-7}$ cells/ml; (about 0.1–0.2% based on the weight of the fermentation mixture although this varies depending on culture conditions), no alcoholic fermentation takes place practically without need for any special measure but the yeast is allowed to grow to a such level that the alcoholic fermentation can start immediately once the sugar source is replenished. Simultaneous addition of a sugar, which the yeast can ferment, with a gelling agent can provide a gel-like fermented milk with carbon dioxide gas contained therein.

In addition, the process (2) permits easier production of a similar $CO_2$-containing milk-product.

As the gelling agent, it is possible to use gelatin, agar, pectin, carageenan or the like. It can be used in much the same way as its use in the production of hard yogurt and the like. In general, it is used as an aqueous solution of about 40° C. or so. The sugar to be replenished, and sweetening, essence, fruit juice and the like which may be added as desired may preferably be either dissolved or mixed in the solution of the gelling agent.

The amount of the sugar for the alcoholic fermentation is determined on the basis of the amount of carbon dioxide gas desired to be contained in the final product, no matter whether the sugar is added in portions or at once. The concentration of the sugar for the alcoholic fermentation, which is considered to be required for the production of carbon dioxide gas in a volume considered preferable from the viewpoint of taste and flavor, may be about 0.2–0.8% at the stage of initiation of the alcoholic fermentation.

When it is desired to add a sweetening and/or a fruit juice to the product and the sweetening and/or fruit juice contains sugars fermentable by the yeast employed for the alcoholic fermentation and still remaining in the product, it is necessary to adjust the the amount of the sugar to be added for the alcoholic fermentation by subtracting the above sugars. Where the yeast is sucrose fermenting for example, the above care is needed when sucrose is used as a sweetening. However, use of a lactose non-fermenting and galactose non-fermenting yeast, for example, *Saccharomyces unisporus* allows to use sucrose, which is the best in sweetness characteristics and the like, without any limitations.

The culture broth added with the gelling agent and others is promptly packed in and in pressure containers, in which its coagulation and alcoholic fermentation are allowed to proceed. The coagulation proceeds faster as the temperature is lowered, whereas 15°–30° C. is generally suitable for the alcoholic fermentation. In the production process of this invention, it is desirable to have the coagulation and alcoholic fermentation completed at the same time or to have the alcoholic fermentation completed a little earlier than the coagulation by choosing the temperature after the packing in the containers. If the production of carbon dioxide gas by the alcoholic fermentation takes place too early compared with the progress of the coagulation, the distribution of carbon dioxide gas in the product becomes uneven. If the production of the gas is too slow on the contrary, the resulting gas may develop cracks in the coagulated product.

It is desirable to bring the alcoholic fermentation in the containers to completion as the final step of the production process of this invention at the plant. However, the sugar or sugars available for the alcoholic fermentation are limited in amount. The carbon dioxide content, flavor and taste of the product would not be affected substantially even if the product is shipped out with the fermentable sugar or sugars partly remaining unfermented and the remaining sugar or sugars undergo fermentation at the stage of the distribution of the product.

After completion of the fermentation in the above manner without remainder of any substantial portion of the sugar source for the alcoholic fermentation, post processing is applied as needed depending on the kind of the product.

When it is desired to add a sweetening and/or a fruit juice to the product, sugars contained in the sweetening and/or fruit juice must not be fermentable by the yeast employed for the alcoholic fermentation and still remaining in order to avoid any secondary alcoholic fermentation. Where the yeast is sucrose fermenting for example, sucrose must not be used as a sweetening. Where the yeast is lactose non-fermenting and galactose non-fermenting and also sucrose non-fermenting, for example, *Saccharomyces bisporus* IFO-0467, it is possible to use as a sweetening sucrose whose sweetness characteristics and the like are best.

The present invention will hereinafter be described in further detail by the following examples. It should however be borne in mind that this invention is not limited to the following examples.

EXAMPLE 1

Reconstituted skim milk having a nonfat milk solids content of 18% w/v was inoculated with 0.5% of a starter of *Streptococcus thermophilus* (IFO-3535), followed by culture at 37° C. for 20 hours. When the pH had dropped to 4.50, the culture broth was cooled. Mixed with 500 parts of the culture broth were 500 parts of an aqueous solution which contained sugars as sweetening and sugar sources for alcohol fermentation, a fruit juice, a stabilizer (high methoxyl pectin), etc. Of the sugars added, the amount of the sugars fermentable by *Saccharomyces bisporus*, namely, glucose and fructose was 6 parts.

The resultant mixture was inoculated with 1.0% of a starter of *Saccharomyces bisporus* (IFO-0467) which had been prepared separately. Thereafter, the mixture was incubated at 30° C. for 18 hours. After confirming that the total content of glucose and fructose had been reduced to 0.01% or lower in the culture broth, the culture broth was cooled to 5° C. or lower, homogenized and then packed in sealed containers.

The kefir-like fermented milk obtained as described above contained 0.3% of ethanol which had been produced by the yeast. It had characteristic flavor and taste attributable to the ethanol and carbon dioxide and was delicious. Even when the product was left over at room temperature, evolution of carbon dioxide by secondary alcoholic fermentation was practically unobserved so that the product retained its original flavor and taste for a long time.

EXAMPLE 2

Reconstituted skim milk having a nonfat milk solids content of 18% w/v was inoculated with 0.5% of a starter of *Streptococcus thermophilus* (IFO-3535) and 1.0% of a starter of *Candida solani* (IFO-0762), followed by culture at 37° C. for 20 hours. When the pH had dropped to 4.50, the culture broth was cooled. Mixed with 500 parts of the culture broth were 500 parts of an aqueous solution which contained sugars as sweetening and sugar sources for alcohol fermentation, a fruit juice, a stabilizer (high methoxyl pectin), etc. Of the sugars added, the amount of the sugars fermentable by *Candida solani*, namely, sucrose, glucose and fructose was 6 parts. The resultant mixture was then incubated at 30° C. for 18 hours. After confirming that the total content of sucrose, glucose and fructose had been reduced to 0.01% or lower in the culture broth, the culture broth was cooled to 5° C. or lower, homogenized and then packed in sealed containers.

The kefir-like fermented milk obtained as described above contained 0.3% of ethanol which had been produced by the yeast. It had characteristic flavor and taste attributable to the ethanol and carbon dioxide and was delicious. Even when the product was left over at room temperature, evolution of carbon dioxide by secondary alcoholic fermentation was practically unobserved so that the product retained its original flavor and taste for a long time.

EXAMPLE 3

Reconstituted skim milk having a nonfat milk solids content of 18% w/v and containing 1.2% of sucrose as a sugar source for alcoholic fermentation was inoculated with 0.5% of a starter of *Streptococcus thermophilus* (IFO-3535) and 1.0% of a starter of *Torulopsis colliculosa* (IFO-0381), followed by culture at 34° C. for 24 hours. After confirming that the pH had dropped to 4.1–4.2 and the total content of sucrose, glucose and fructose had been reduced to 0.01% or lower in the culture broth, the culture broth was cooled. Mixed with 500 parts of the culture broth were 500 parts of an aqueous solution which contained a sweetening (Aspartame) and a stabilizer (High methoxyl pectin), etc. The resultant mixture was then cooled to 5° C. or lower, homogenized and then packed in sealed containers.

The kefir-like fermented milk obtained as described above contained 0.3% of ethanol which had been produced by the yeast. It had characteristic flavor and taste attributable to the ethanol and carbon dioxide and was delicious. Even when the product was left over at room temperature, evolution of carbon dioxide by secondary alcoholic fermentation was practically unobserved so that the product retained its original flavor and taste for a long time.

EXAMPLE 4

Reconstituted skim milk having a nonfat milk solids content of 18% w/v was inoculated with 0.5% of a starter of *Streptococcus lactis* (ATCC-11454), followed by culture at 30° C. for 20 hours. When the pH had dropped to 4.45, the culture broth was cooled. Mixed with 500 parts of the culture broth were 500 parts of an aqueous solution which contained sugars as sweetening and sugar sources for alcohol fermentation, a fruit juice, a stabilizer (High methoxyl pectin), etc. Of the sugars added, the amount of the sugars fermentable by *Saccharomyces unisporus*, namely, glucose and fructose was 6 parts.

The resultant mixture was inoculated with 1.0% of a starter of *Saccharomyces unisporus* (IFO-0316) which had been prepared separately. Thereafter, the mixture was incubated at 30° C. for 15 hours. After confirming that the total content of glucose and fructose had been reduced to 0.01% or lower in the culture broth, the culture broth was cooled to 5° C. or lower, homogenized and then packed in sealed containers.

The kefir-like fermented milk obtained as described above contained 0.3% of ethanol which had been produced by the yeast. It had characteristic flavor and taste attributable to the ethanol and carbon dioxide and was delicious. Even when the product was left over at room temperature, evolution of carbon dioxide by secondary alcoholic fermentation was practically unobserved so that -the product retained its original flavor and taste for a long time.

EXAMPLE 5

Reconstituted skim milk having a nonfat milk solids content of 18% w/v was inoculated with 0.5% of a starter of *Streptococcus lactis* (ATCC-11454) and 1.0% of a starter of *Saccharomyces unisporus* (IFO-0316), followed by culture at 30° C. for 20 hours. When the pH had dropped to 4.45, the culture broth was cooled. Mixed with 500 parts of the culture broth were 500 parts of an aqueous solution which contained sugars as sweetening and sugar sources for alcohol fermentation, a fruit juice, a stabilizer (high methoxyl pectin), etc. Of the sugars added, the amount of the sugars fermentable by *Saccharomyces unisporus*, namely, glucose and fructose was 6 parts. The resultant mixture was then incubated at 30° C. for 15 hours. After confirming that the total content of glucose and fructose had been reduced to 0.01% or lower in the culture broth, the culture broth was cooled to 5° C. or lower, homogenized and then packed in sealed containers.

The kefir-like fermented milk obtained as described above contained 0.3% of ethanol which had been produced by the yeast. It had characteristic flavor and taste attributable to the ethanol and carbon dioxide and was delicious. Even when the product was left over at room temperature, evolution of carbon dioxide by secondary alcoholic fermentation was practically unobserved so that the product retained its original flavor and taste for a long time.

EXAMPLE 6

Reconstituted skim milk having a nonfat milk solids content of 18% w/v and containing 1.2% of sugars as sugar sources for alcoholic fermentation was inoculated with 0.5% of a starter of *Streptococcus lactis* (ATCC- 11454) and 1.0% of a starter of *Saccharomyces unisporus* (IFO-0316), followed by culture at 30° C. for 24 hours. After confirming that the pH had dropped to 4.1-4.2 and the total content of glucose and fructose had been reduced to 0.01% or lower in the culture broth, the culture broth was cooled. Mixed with 500 parts of the culture broth were 500 parts of an aqueous solution which contained a sweetening and a stabilizer (high methoxyl pectin). The resultant mixture was then cooled to 5° C. or lower, homogenized and then packed in sealed containers.

The kefir-like fermented milk obtained as described above contained 0.3% of ethanol which had been produced by the yeast. It had characteristic flavor and taste attributable to the ethanol and carbon dioxide and was delicious. Even when the product was left over at room temperature, evolution of carbon dioxide by secondary alcoholic fermentation was practically unobserved so that the product retained its original flavor and taste for a long time.

EXAMPLE 7

Reconstituted skim milk having a nonfat milk solids content of 18% w/v was inoculated with 0.5% of a starter of *Streptococcus lactis* (ATCC-11454), followed by culture at 30° C. When the pH had dropped to 4.45 upon an elapsed time of about 20 hours, the culture broth was cooled. Mixed with 500 parts of the culture broth were 200 parts of an aqueous sugar solution which contained glucose and fructose as sugar sources for alcohol fermentation. After the mixing, the total concentration of the fermentable sugars was 0.2%.

The resultant mixture was inoculated with 1.0% of a starter of *Saccharomyces unisporus* (IFO-0316) which had been prepared separately. Thereafter, the mixture was cultured at 30° C. for 10 hours under aerobic conditions. As a result, the cell population of the yeast increased to $8 \times 10^6$ cells/ml and the concentration of the sugars added before the fermentation dropped to 0.01% or lower.

Thereafter, the culture broth was added and mixed with 100 parts of a 5.0% gelatin solution of 40° C. and 200 parts by weight of a 0.5% agar solution of 60° C. A homogenization treatment was applied while the temperature of the liquid mixture was 38° C. or higher. The resulting mixture was then packed in pressure containers. Incidentally, the gelatin solution and agar solution had been added beforehand with glucose and fructose as sugar sources for alcoholic fermentation to give a total sugar content of 0.4% after being mixed with the culture broth. No carbon dioxide bubbles evolved in the packing step, so that the packing was easy.

The semifinished product packed in the containers was allowed to stand at 15° C. for 20 hours to undergo alcoholic fermentation. It was then cooled to 10° C. or lower and stored at that temperature.

After the cooling, the product was coagulated uniformly as a whole and carbon dioxide bubbles and cracks were unobserved practically. The sugars added for the alcoholic fermentation had been consumed to a concentration of 0.01% or lower, whereby the product was found to have no potential problem of undergoing secondary alcoholic fermentation at the stage of its distribution. The flavor and taste were full of refreshing feeling, accompanied by titillation derived from carbon dioxide gas.

EXAMPLE 8

Reconstituted skim milk having a nonfat milk solids content of 18% w/v and containing 0.2% of glucose and fructose as sugar sources for alcoholic fermentation was inoculated with 0.5% of a starter of *Streptococcus lactis* (ATCC-11454) and 1.0% of a starter of *Saccharomyces unisporus* (IFO-0316), followed by culture at 30° C. Upon an elapsed time of about 24 hours, the pH and yeast cell population reached 4.3 and $9.0 \times 10^6$ cells/ml, respectively, and the total concentration of the sugars added before the fermentation dropped to 0.01% or lower.

Mixed with 500 parts of the culture broth thus obtained were 100 parts of a 5.0% gelatin solution 200 parts of a 0.5% agar solution and 200 parts of a sugar solution, whose temperatures were all 46° C. A homogenization treatment was applied while the temperature of the liquid mixture was 38° C. or higher. The resulting mixture was then packed in pressure containers. Incidentally, the sugar solution had been added beforehand with glucose and fructose as sugar sources for alcoholic fermentation to give a total sugar content of 0.4% after being mixed with the culture broth. No carbon dioxide bubbles evolved in the packing step, so that the packing was easy.

The semifinished product packed in the containers was allowed to stand at 15° C. for 20 hours to undergo alcoholic fermentation. It was then cooled to 10° C. or lower and stored at that temperature.

After the cooling, the product was coagulated uniformly as a whole and carbon dioxide bubbles and cracks were unobserved practically. The sugars added for the alcoholic fermentation had been consumed substantially (to a concentration of 0.01% or lower), whereby the product was found to have no potential problem of undergoing secondary alcoholic fermentation at the stage of its distribution. The flavor and taste were full of refreshing feeling, accompanied by titillation derived from carbon dioxide gas.

We claim:

1. A process for controlling alcoholic fermentation during the production of a kefir-like fermented milk from a raw material containing lactose and at least one other sugar, which comprises:
   a) subjecting the lactose to lactic acid fermentation with a lactic acid bacterium, and
   b) subjecting the sugar to alcoholic fermentation with a yeast,
      wherein the alcoholic fermentation is controlled by:
      1) conducting the fermentation with a lactose non-fermenting and galactose non-fermenting yeast until all assimilable sugar sources are substantially eliminated, or
      2) conducting the fermentation with a combination of a lactic-acid bacterium, which does not cause accumulation of galactose in the resulting fermentation mixture, and a lactose non-fermenting yeast until all assimilable sugar sources are substantially eliminated.

2. The process as claimed in claim 1, wherein the lactic acid fermentation and alcoholic fermentation are conducted simultaneously.

3. The process as claimed in claim 1, wherein the lactic acid fermentation and alcoholic fermentation are conducted sequentially.

4. The process as claimed in claim 1, wherein the lactose non-fermenting and galactose non-fermenting yeast is also sucrose non-fermenting.

5. The process as claimed in claim 1, further comprising adding sucrose as a sweetening.

6. The process as claimed in claim 1, wherein the raw material contains mammal's milk.

7. The process as claimed in claim 6, wherein the mammal's milk is selected from cow's milk, goat's milk, horse's milk or buffalo's milk.

8. The process as claimed in claim 1, wherein the lactic acid fermentation and alcoholic fermentation are conducted simultaneously.

9. The process as claimed in claim 1, wherein the lactic acid fermentation and alcoholic fermentation are conducted sequentially.

10. The process as claimed in claim 1, wherein the lactose non-fermenting yeast is also sucrose non-fermenting.

11. The process as claimed in claim 10, further comprising adding sucrose as a sweetening.

12. The process as claimed in claim 1, wherein said lactic acid bacterium not causing accumulation of galactose is selected from the group consisting of *Streptococcus lactis, Streptococcus facalis, Lactobacillus casei, Lactobacillus lactis, Lactobacillus fermenti* and *Lactobacillus yougurti.*

13. The process as claimed in claim 1, wherein said lactose non-fermenting yeast is selected from the group consisting of *Saccharomyces cerevisiae, Saccharomyces unisporus* and *Saccharomyces carlbergensis.*

14. The process as claimed in claim 1, wherein said lactose non-fermenting and galactose non-fermenting yeast is selected from the group consisting of *Saccharomyces bisporus* IFO-0467, *Saccharomyces mellis, Saccharomyces rouxii, Kuloeckeva africana, Kuloeckeva apiculata, Torulopsis anatomiae, Torulopsis castellii, Saccharomyces bayanus, Saccharomyces fermentati, Candida solani* IFO-0762, *Kuloeckera javanica, Kuloeckera jensenii, Torulopsis bacillaris* and *Torulopsis colliculosa.*

15. The process as claimed in claim 1, wherein said alcoholic fermentation is allowed to proceed until the sugar content is 0.01% or less in the culture broth.

16. A process for controlling alcoholic fermentation during the production of a gelatinous kefir-like fermented milk from a raw material containing lactose and at least one other sugar, which comprises:
a) subjecting the lactose to lactic acid fermentation with a lactic bacterium, and
b) adding a gelling agent to cause gelation and subjecting the sugar to alcoholic fermentation with a yeast, wherein the alcoholic fermentation is controlled by:
1) conducting the fermentation with a lactose non-fermenting and a galactose non-fermenting yeast until all assimilable sugar sources are substantially eliminated, or
2) conducting the fermentation with a combination of a lactic acid bacterium, which does not cause accumulation of galactose in the resulting fermentation mixture, and a lactose non-fermenting yeast until all assimilable sugar sources are substantially eliminated.

17. The process as claimed in claim 16, wherein after the lactic acid fermentation, the gelling agent is added to the resulting culture broth and the thus-obtained mixture is packed in a pressure container to control the alcoholic fermentation to start thereafter.

18. The process as claimed in claim 16, wherein a lactose non-fermenting yeast is used as the yeast for the alcoholic fermentation, a first supply of assimilable sugar source is caused to exist in the fermentation mixture at the stage of the lactic acid fermentation in an amount sufficient for the yeast to grow but insufficient for the yeast to conduct the alcoholic fermentation, and a second supply of assimilable sugar source is added either at the same time as or after the addition of the gelling agent in an amount sufficient to conduct the alcoholic fermentation.

19. The process as claimed in claim 16, wherein said lactic acid bacterium not causing accumulation of galactose is selected from the group consisting of *Streptococcus lactis, Streptococcus facalis, Lactobacillus casei, Lactobacillus lactis, Lactobacillus fermenti* and *Lactobacillus yougurti.*

20. The process as claimed in claim 16, wherein said lactose non-fermenting yeast is selected from the group consisting of *Saccharomyces cerevisiae, Saccharomyces unisporus* and *Saccharomyces carlbergensis.*

21. The process as claimed in claim 16, wherein said lactose non-fermenting and galactose non-fermenting yeast is selected from the group consisting of *Saccharomyces bisporus* IFO-0467, *Saccharomyces mellis, Saccharmoyces rouxii, Kuloeckeva africana, Kuloeckeva apiculata, Torulopsis anatomiae, Torulopsis castellii, Saccharomyces bayanus, Saccharomyces fermentati, Candida solani* IFO-0762, *Kuloeckera javanica, Kuloeckera jensenii, Torulopsis bacillaris* and *Torulopsis colliculosa.*

22. The process as claimed in claim 16, wherein said alcoholic fermentation is allowed to proceed until the sugar content is 0.01% or less in the culture broth.

* * * * *